United States Patent
Soda et al.

(10) Patent No.: US 8,451,468 B2
(45) Date of Patent: May 28, 2013

(54) PROCESSOR, IMAGE FORMING SYSTEM AND COMPUTER READABLE MEDIUM

(75) Inventors: Takeshi Soda, Niigata (JP); Masaki Ueki, Niigata (JP); Hiroo Yoshida, Niigata (JP); Takashi Oyama, Niigata (JP); Makoto Watanabe, Niigata (JP); Shigehisa Suzuki, Niigata (JP); Sakae Ito, Niigata (JP); Yukio Nizawa, Niigata (JP); Takashi Tanabe, Niigata (JP); Tsutomu Taji, Niigata (JP)

(73) Assignee: Fuji Xerox Co., Ltd., Tokyo (JP)

( * ) Notice: Subject to any disclaimer, the term of this patent is extended or adjusted under 35 U.S.C. 154(b) by 947 days.

(21) Appl. No.: 12/546,181

(22) Filed: Aug. 24, 2009

(65) Prior Publication Data
US 2010/0208307 A1    Aug. 19, 2010

(30) Foreign Application Priority Data
Feb. 19, 2009   (JP)  ............... P2009-037092

(51) Int. Cl.
*G06K 15/00*   (2006.01)
*G03G 15/00*   (2006.01)

(52) U.S. Cl.
USPC ........... 358/1.14; 358/1.1; 358/1.15; 399/8; 399/9; 714/25

(58) Field of Classification Search
USPC ............ 358/1.1, 1.14, 1.15; 399/8, 9, 10, 399/12; 714/25, 26
See application file for complete search history.

(56) References Cited

U.S. PATENT DOCUMENTS

| | | | | |
|---|---|---|---|---|
| 5,166,934 A * | 11/1992 | Tomiyama et al. | ............. | 714/26 |
| 5,239,547 A * | 8/1993 | Tomiyama et al. | ............. | 714/26 |
| 5,515,503 A * | 5/1996 | Shimomura et al. | ............ | 714/26 |
| 6,427,053 B1 * | 7/2002 | Eck et al. | ........................ | 399/10 |
| 6,782,495 B2 * | 8/2004 | Bernklau-Halvor | ............ | 714/44 |
| 7,110,917 B2 * | 9/2006 | Matsuura et al. | ............. | 702/185 |

(Continued)

FOREIGN PATENT DOCUMENTS

| | | |
|---|---|---|
| JP | A-07-044526 | 2/1995 |
| JP | A-11-309928 | 11/1999 |

(Continued)

OTHER PUBLICATIONS

Office Action issued in Japanese Patent Application No. 2009-037092 dated Nov. 30, 2010 (with translation).

*Primary Examiner* — Kimberly A Williams
(74) *Attorney, Agent, or Firm* — Oliff & Berridge, PLC (57) ABSTRACT

A processor is provided, the processor including: an obtaining unit that obtains abnormality information related to an abnormality from an image forming device in which the abnormality occurs; an abnormality information storing unit that stores the abnormality information obtained by the obtaining unit as history information; a failure position information storing unit that stores failure position information for each phenomenon related to the abnormality; an extracting unit that extracts the failure position information corresponding to the latest abnormality information and abnormality information similar to the latest abnormality information among the abnormality information stored in the abnormality information storing unit from the failure position information storing unit; and an output unit that outputs an extracted result extracted by the extracting unit as specific deciding information of a cause related to the occurring abnormality.

5 Claims, 10 Drawing Sheets

U.S. PATENT DOCUMENTS

| | | | |
|---|---|---|---|
| 7,203,431 B2* | 4/2007 | Shoji et al. | 399/9 |
| 7,327,962 B2* | 2/2008 | Shoji et al. | 399/9 |
| 2002/0044783 A1* | 4/2002 | Eck et al. | 399/10 |
| 2003/0112452 A1* | 6/2003 | McIntyre | 358/1.1 |
| 2005/0154562 A1* | 7/2005 | Matsuura et al. | 702/185 |
| 2005/0157327 A1* | 7/2005 | Shoji et al. | 358/1.14 |
| 2007/0127934 A1* | 6/2007 | Shoji et al. | 399/9 |
| 2008/0065932 A1* | 3/2008 | Izumiya et al. | 714/40 |
| 2012/0200890 A1* | 8/2012 | Okumura | 358/1.15 |

FOREIGN PATENT DOCUMENTS

| | | |
|---|---|---|
| JP | A-2002-073501 | 3/2002 |
| JP | A-2005-301413 | 10/2005 |
| JP | A-2007-065934 | 3/2007 |
| JP | A-2007-328641 | 12/2007 |

* cited by examiner

| | E50 | | E40 | | E30 | | E20 | | E10 | |
|---|---|---|---|---|---|---|---|---|---|---|
| ERROR | A | ERROR | B | ERROR | C | ERROR | A | ERROR | A | |
| QUALITY OF SHEET | A | QUALITY OF SHEET | A | QUALITY OF SHEET | C | QUALITY OF SHEET | B | QUALITY OF SHEET | C | |
| SIZE | A | SIZE | A | SIZE | B | SIZE | C | SIZE | B | |
| KIND OF MACHINE | A | KIND OF MACHINE | A | KIND OF MACHINE | B | KIND OF MACHINE | A | KIND OF MACHINE | A | |
| ERROR POSITION | A | ERROR POSITION | A | ERROR POSITION | C | ERROR POSITION | B | ERROR POSITION | C | |
| PRINTING SPEED | A | PRINTING SPEED | A | PRINTING SPEED | C | PRINTING SPEED | C | PRINTING SPEED | B | |
| RESOLUTION | A | RESOLUTION | A | RESOLUTION | B | RESOLUTION | B | RESOLUTION | B | |
| DATE | | DATE | | DATE | | DATE | | DATE | | |

NEW ←——————→ OLD

ERROR INFORMATION OF THIS TIME → E50

| | |
|---|---|
| ERROR | A |
| QUALITY OF SHEET | A |
| SIZE | A |
| KIND OF MACHINE | A |
| ERROR POSITION | A |
| PRINTING SPEED | A |
| RESOLUTION | A |
| DATE | |

FIG. 8B

SIMILAR ERROR INFORMATION — E20, E10

| | E20 | | E10 | |
|---|---|---|---|---|
| ERROR | A | ERROR | A |
| QUALITY OF SHEET | B | QUALITY OF SHEET | C |
| SIZE | C | SIZE | B |
| KIND OF MACHINE | A | KIND OF MACHINE | A |
| ERROR POSITION | B | ERROR POSITION | C |
| PRINTING SPEED | C | PRINTING SPEED | B |
| RESOLUTION | B | RESOLUTION | B |
| DATE | | DATE | |

FIG. 9

LIST OF FAILURE POSITION INFORMATION

- FAILURE POSITION INFORMATION #1
- FAILURE POSITION INFORMATION #3
- FAILURE POSITION INFORMATION #2
- FAILURE POSITION INFORMATION #4

PROCESSOR, IMAGE FORMING SYSTEM AND COMPUTER READABLE MEDIUM

CROSS-REFERENCE TO RELATED APPLICATIONS

This application is based on and claims priority under 35 USC 119 from Japanese Patent Application No. 2009-037092 filed on Feb. 19, 2009.

BACKGROUND

1. Technical Field

The present invention relates to a processor, an image forming system and a computer readable medium.

2. Related Art

In a system, a company in which a printer is installed is connected to a service center that obtains the state of the printer through a network. The system is provided with a remote collecting arrangement of printer information through a network option device.

The remote collecting arrangement of printer information is constructed as described below. Namely, the service center periodically obtains the state of the printer via the network and infers a trouble or the state of consumption goods on the basis of the obtained information of the printer before a contact from a user. Then, the service center confirms the company as the user in which the printer is installed about the inferred trouble or the state of consumption goods, for instance, by telephone. Thus, in the service center, since a service man does not need to go to the spot (the company as the user) to recognize the state of the printer such as the trouble or the consumption goods, a time necessary for dealing with the user is shortened.

However, many companies are not permitted to connect (do not desire to connect) the printer as an information device to the service center outside the company from the viewpoint of security. For such companies, the above-described remote collecting arrangement of printer information may not be used. Namely, it is impossible for the service center to rapidly and precisely report the state of the printer such as the trouble of the printer to the company as the user in which the printer is installed.

SUMMARY

According to an aspect of the present invention, there is provided a processor, including an obtaining unit that obtains abnormality information related to an abnormality from an image forming device in which the abnormality occurs; an abnormality information storing unit that stores the abnormality information obtained by the obtaining unit as history information; a failure position information storing unit that stores failure position information for each phenomenon related to the abnormality; an extracting unit that extracts the failure position information corresponding to the latest abnormality information and abnormality information similar to the latest abnormality information among the abnormality information stored in the abnormality information storing unit from the failure position information storing unit; and an output unit that outputs an extracted result extracted by the extracting unit as specific deciding information of a cause related to the occurring abnormality.

BRIEF DESCRIPTION OF THE DRAWINGS

Exemplary embodiments of the invention will be described in detail based on the following figures, wherein.

DETAILED DESCRIPTION

Now, an exemplary embodiment as one example of the present invention will be described below in detail by referring to the drawings. In the drawings for explaining the exemplary embodiment, the same components are, as a general rule, designated by the same reference numerals, and a repetitive explanation thereof will be omitted.

Figure 1:
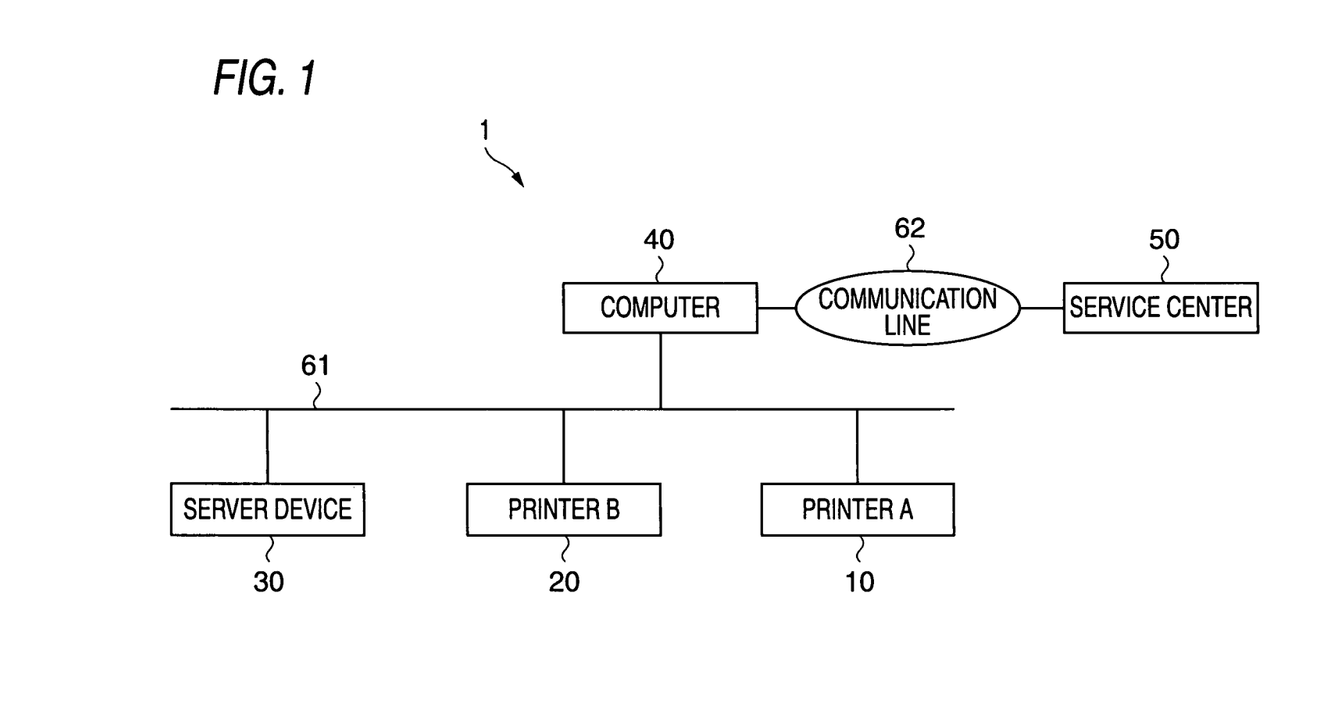
FIG. 1 is a diagram showing a structure of an image forming system according to an exemplary embodiment.

FIG. 1 shows a structure of an image forming system according to the exemplary embodiment.

In the image forming system 1, as shown in FIG. 1, a plurality of printers 10 and 20, a server device 30 and a computer 40 are connected to a communication line 61. The computer 40 and a service center 50 are connected to a communication line 62.

As the communication lines 61 and 62, are exemplified a wired communication line such as a local area network (LAN) or a telephone line, a radio communication line such as a radio LAN, a combination of these communication lines, etc. As the communication line 61, the LAN is employed.

Figure 2:
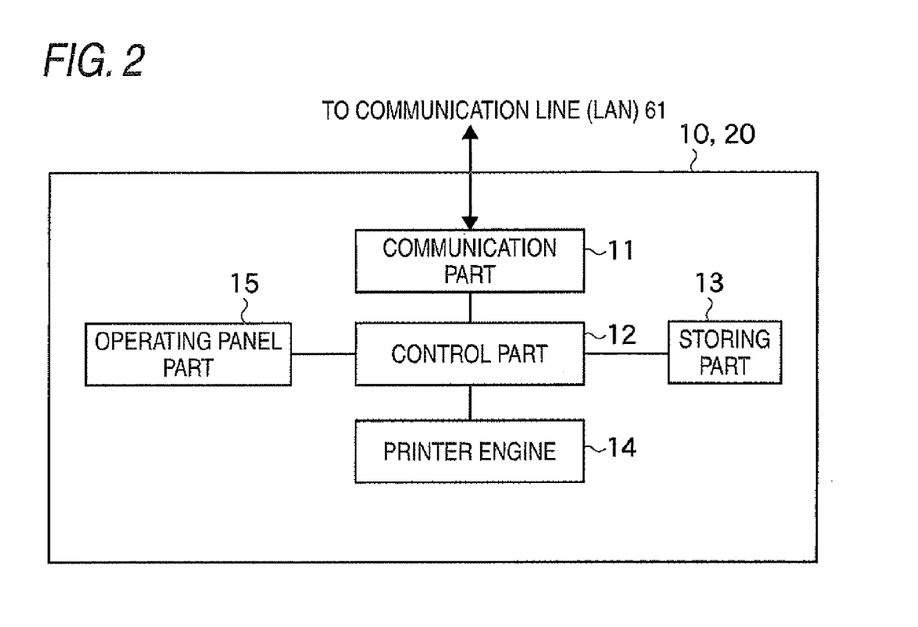
FIG. 2 is a block diagram showing a functional structure of a printer according to the exemplary embodiment.

The printer 10 as an image forming device includes, as shown in FIG. 2, a communication part 11, a control part 12, a storing part 13, a printer engine 14 and an operating panel part 15.

The communication part 11 is connected to the communication line 61 to communicate with the server device 30 or the computer 40 connected to the communication line 61.

The control part 12 stores print data obtained from the computer 40 through the communication part 11 in the storing part 13, converts the print data to data in a data form that may be printed in the printer engine 14 and outputs the converted data (image data) to the printer engine 14.

Further, when an abnormality occurs in the printer 10, for instance, when an abnormality related to a printing process occurs in the printer engine 14, the control part 12 stores abnormality information related to the abnormality in the storing part 13 and transmits the abnormality information to the server device 30 through the communication part 11.

The abnormality information includes abnormality contents showing contents of the occurring abnormality, a quality of a sheet as a recording medium to be printed, a size of the sheet, a kind of the printer, an abnormal position showing a position where the abnormality occurs, a printing speed, a resolution and a date of a printing process.

In the exemplary embodiment, the abnormality information is defined as error information. In the error information, the "abnormality contents showing the contents of the occurring abnormality" of element information respectively included in the error information designates "error contents showing the contents of an occurring error" and the "abnormal position showing a position where the abnormality occurs" designates an "error position showing a position where the error occurs".

The storing part 13 stores the print data and the error information (the abnormality information).

The printer engine 14 is an image forming unit for carrying out, for instance, an electro-photographic process to execute an image forming process in accordance with the image data (raster data) from the control part 12 and outputs a printed matter (a recording medium such as the sheet on which an image is formed) as a result of the image forming process.

The operating panel part 15 has a display function for presenting display information such as information showing the state of the printer 10 or a message to a user and an input function for inputting instruction information to the printer 10 or input information such as a designation of a selection item in a menu.

Since the printer 20 also has the same structure as that of the printer 10, an explanation of a detail of the structure thereof will be omitted.

Figure 3:
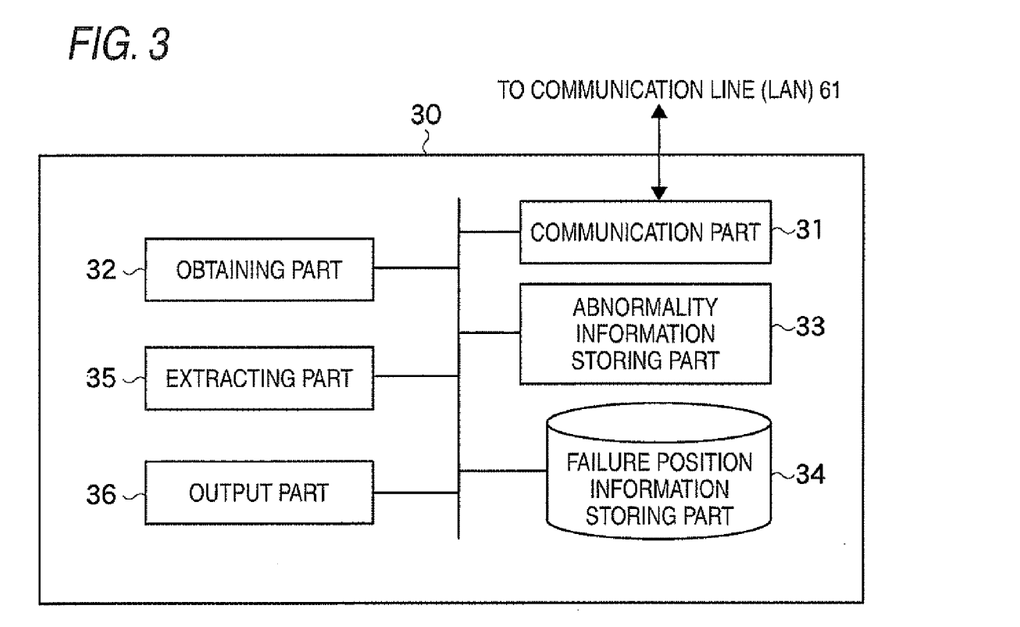
FIG. 3 is a block diagram showing a functional structure of a server device according to the exemplary embodiment.

The server device 30 as a processor includes, as shown in FIG. 3, a communication part 31, an obtaining part 32, an abnormality information storing part 33, a failure position information storing part 34, an extracting part 35 and an output part 36.

The communication part 31 is connected to the communication line 61 to communicate with the printers 10 and 20 and the computer 40 connected to the communication line 61.

The obtaining part 32 has a function as an obtaining unit to obtain the error information (the abnormality information) from the printer in which the error (the abnormality) occurs through the communication part 31 and store the obtained error information in the abnormality information storing part 33.

The abnormality information storing part 33 has a function as an abnormality information storing unit to store the error information (the abnormality information) as history information. A detail of the history information will be described below.

The failure position information storing part 34 has a function as a failure position information storing unit to previously store information showing a failure position (refer it to as "failure position information", hereinafter) for each phenomenon related to the abnormality. In the exemplary embodiment, the failure position information storing part 34 stores a table in which the failure position information is registered for each phenomenon related to the abnormality. A detail of the table will be described below.

The extracting part 35 has a function as an extracting unit to extract from the failure position information storing part 34 the failure position information corresponding to the latest error information and error information similar to the latest error information in the error information as the history information stored in the abnormality information storing part 33.

Further, the extracting part 35 substitutes the parameters of the latest error information and the error information similar to the latest error information respectively for a conditional expression to calculate the conditional expression. Thus, the extracting part 35 extracts the failure position information corresponding to the error information from the failure position information storing part 34.

Further, when an extracted result includes a plurality of failure position information, the extracting part 35 makes clear whether the rate of a cause estimated to be related to the occurring error is high or low for the plurality of failure position information.

The output part 36 has a function as an output unit to output the extracted result extracted by the extracting part 35 as specific deciding information of the cause related to the occurring error.

Now, the history information stored in the abnormality information storing part 33 will be described below by referring to FIG. 4.

Figure 4:
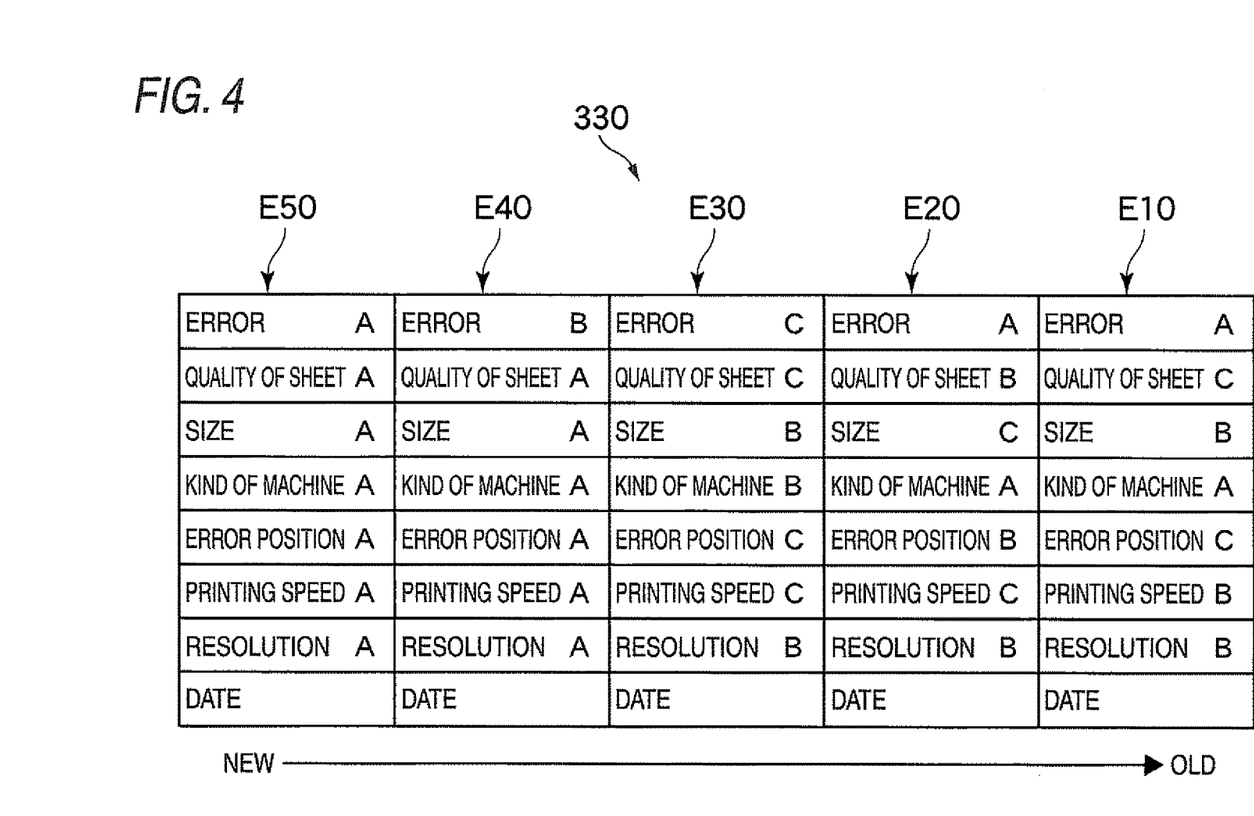
FIG. 4 is a diagram showing one example of history information stored in an abnormality information storing part of the server device according to the exemplary embodiment.

The history information 330 includes the error information E10 to E50 as shown in FIG. 4. The error information E50 designates the latest error information and the error information Elf designates the oldest error information.

In FIG. 4, "A", "B" and "C" corresponding to the element information including the error that forms the error information (the error contents), the quality of the sheet, the size, the kind of the printer, the error position, the printing speed, the resolution and the date respectively show values for each element information. In the error information E10 to E50 respectively, the value "A", the value "B" and the value "C" corresponding to the same element information respectively designate the same values.

For instance, as the values of the element information of the error, "fuser error", "jam" or the like may be exemplified. Further, in the case of the error of the jam, the values of the jam are different depending on the contents of the jam such as the jam under a state that the sheet is clean, the jam under a state that the sheet is wrinkled up or the like.

In this case, as the values of the element information of, for instance, the contents of the jam (the error contents) or the occurring position of the jam (the error position), previously set identifiers are set. In such a way, for the values of the element information of the error (the error contents) or the error position, the identifiers respectively corresponding thereto are set.

One example of other element information will be described. As the values of the element information of the quality of the sheet, for instance, an "ordinary sheet", a "coated sheet" or the like may be exemplified. As the values of the element information of the size, for instance, an "A4 size", a "B5 size" or the like may be exemplified. As the values of the element information of the error position, for instance, a "fuser", a "motor", an "exit roll (output roll)", a "reg roll", a "feed roll" or the like may be exemplified.

Now, the table stored in the failure position information storing part 34 will be described below by referring to FIG. 5.

Figure 5:
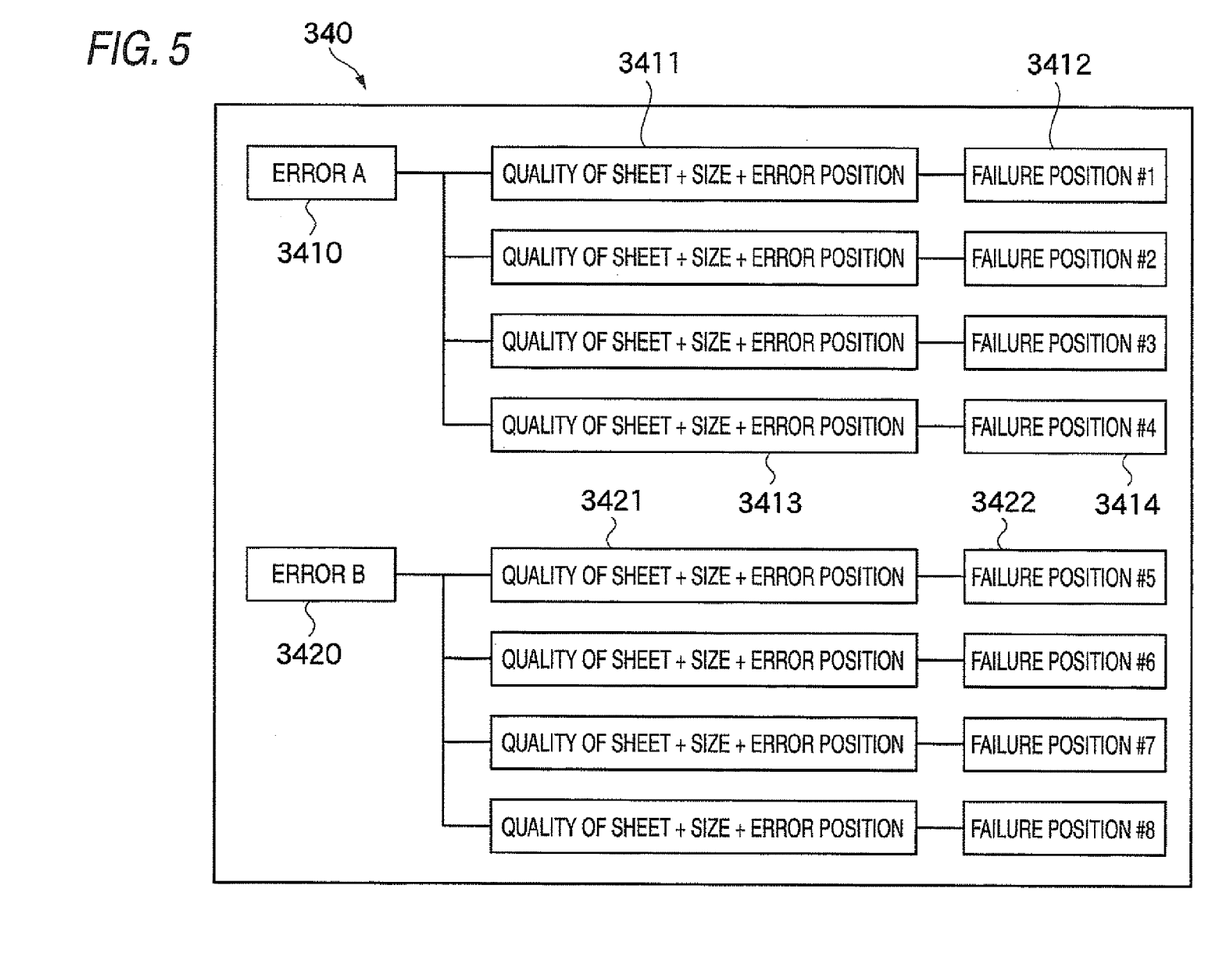
FIGS. 5 is a diagram showing one example of a table stored in a failure position information storing part of the server device according to the exemplary embodiment.

As shown in FIG. 5, in the table 340, the failure position information is registered that is previously set in accordance with the values of the element information of the error information, for instance, the "quality of the sheet", the "size" and the "error position" respectively for each error (the error contents) as one of the element information of the error information.

In an example shown in FIG. 5, in the table 340, four failure position information "failure positions #1 to #4" are respectively registered in accordance with the values of the above-described "quality of sheet", the "size" and the "error position" correspondingly to an error 3410 (error A). Further, four failure position information "failure positions #5 to #8" are respectively registered in accordance with the values of the above-described "quality of sheet", the "size" and the "error position" correspondingly to an error 3420 (error B).

Though the failure positions of the failure position information for each error are respectively different, any failure position of the "failure positions #1 to #4" of the four failure position information corresponding to the error A may be the same as any failure position of the four failure position information "failure positions #5 to #8" corresponding to the error B.

In the exemplary embodiment, the phenomenon related to the abnormality indicates contents obtained by combining together the values of the element information including the error contents related to the error information, the quality of the sheet, the size and the error position respectively. The phenomenon related to the abnormality is supposed to have contents obtained by combining together at least the values of the element information including the error contents (information showing the abnormality) related to the error information and the error position (the position where the abnormality occurs).

For instance, in the example shown in FIG. 5, the phenomenon related to the abnormality is shown by the error 3410 (the error A) as one of the element information of the error information and information 3411 formed with the values of the element information related to the error information including the "quality of the sheet", the "size" and the "error position" respectively. Failure position information 3412 (the "failure position #1") is registered correspondingly to the phenomenon related to the abnormality. Further, the phenomenon related to the abnormality is shown by the error 3410 (the error A) and information 3413 formed with the values of the element information including the "quality of the sheet", the "size" and the "error position" respectively. Failure position information 3414 (the "failure position #4") is registered correspondingly to the phenomenon related to the abnormality.

Similarly, as for the error 3420 (the error B), the phenomenon related to the abnormality is shown by the error 3420 (the error B) as one of the element information of the error information and information 3421 formed with the values of the element information related to the error information including the "quality of the sheet", the "size" and the "error position" respectively. Failure position information 3422 (the "failure position #5") is registered correspondingly to the phenomenon related to the abnormality.

As described above, in the exemplary embodiment, the phenomenon related to the abnormality that is determined by the error (the error contents) as one of the element information of the error information and the information formed with the values of the element information related to the error information including the "quality of the sheet", the "size" and the "error position", respectively is determined in accordance with the values of the element information of the error information respectively. The failure position information is registered correspondingly to the phenomenon related to the abnormality determined in such a way as described above.

Therefore, it may be said that the failure position information corresponds to a result obtained by substituting values (parameter values) respectively for a conditional expression composed of the element information (parameters) including the error (error contents) related to the error information, the "quality of the sheet", the "size" and the "error position" respectively and calculating the conditional expression. In this connection, the extracting part 35 substitutes the parameter values for the conditional expression and calculates the conditional expression.

Figure 6:
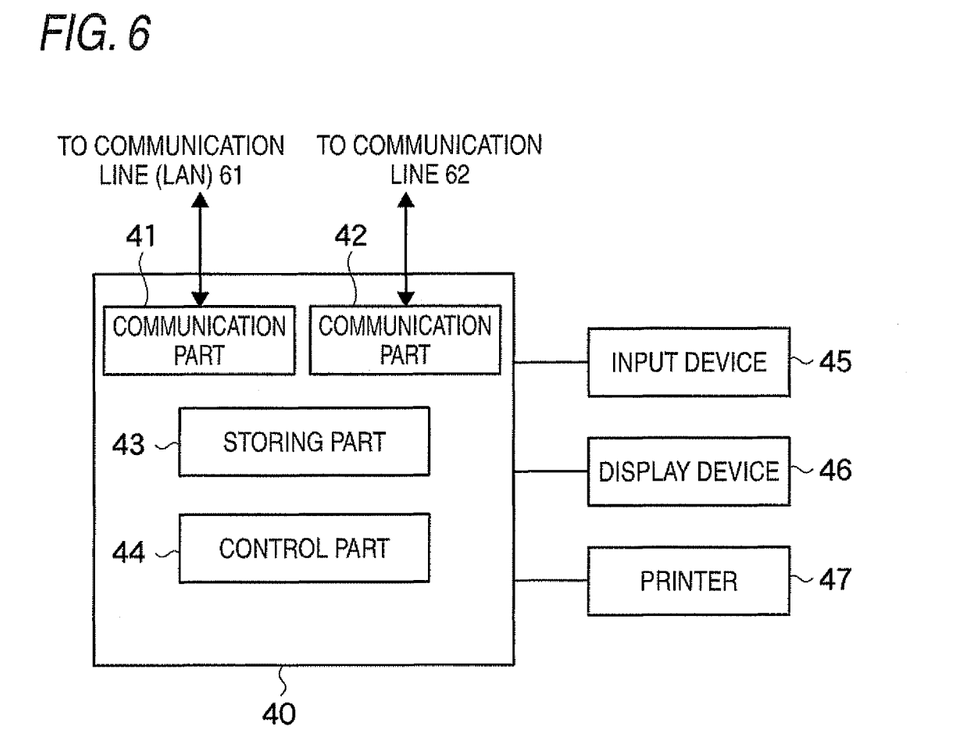
FIG. 6 is a block diagram showing a functional structure of a computer according to the exemplary embodiment.

The computer 40 as an information processor includes, as shown in FIG. 6, a plurality of communication parts 41 and 42, a storing part 43 and a control part 44. Further, an input device 45, a display device 46 and a printer 47 are connected to the computer 40 through interfaces not shown in FIG. 6.

The communication part 41 is connected to the communication line 61 to communicate with the printers 10 and 20 and the server device 30 connected to the communication line 61. The communication part 42 is connected to the communication line 62 to communicate with the service center 50 connected to the communication line 62.

The storing part 43 stores the print data transmitted to the printer 10 or the printer 20 through the communication part 41 and the extracted result (the extracted result as the failure position information corresponding to the error of the printer) from the server device 30 received through the communication part 41.

The control part 44 requests the printer 10 or the printer 20 to print the print data and transmits the extracted result from the server device 30 to the service center 50.

Now, an error process by the printer will be described that is carried out when the error (the abnormality) occurs in the printer, For instance, in the printer 10 (the printer A), when the printer engine 14 carries out a printing process on the basis of the image data (page data) corresponding to the print data, if the error (the abnormality) occurs in the printer engine 14, the control part 12 detects the error, stores the error information related to the error in the storing part 13 and displays the occurrence of the error on the operating panel part 15.

When the user refers to the occurrence of the error displayed on the operating panel part 15 to press down a button provided in the operating panel part 15 and preset to transmit the error information to the server device, the control part 12 receives the press-down operation of the button to transmit the error information stored in the storing part 13 to the server device 30 through the communication part 11.

Now, an extracting process of the failure position information by the server device 30 will be described below by referring to FIG. 7.

Figure 7:
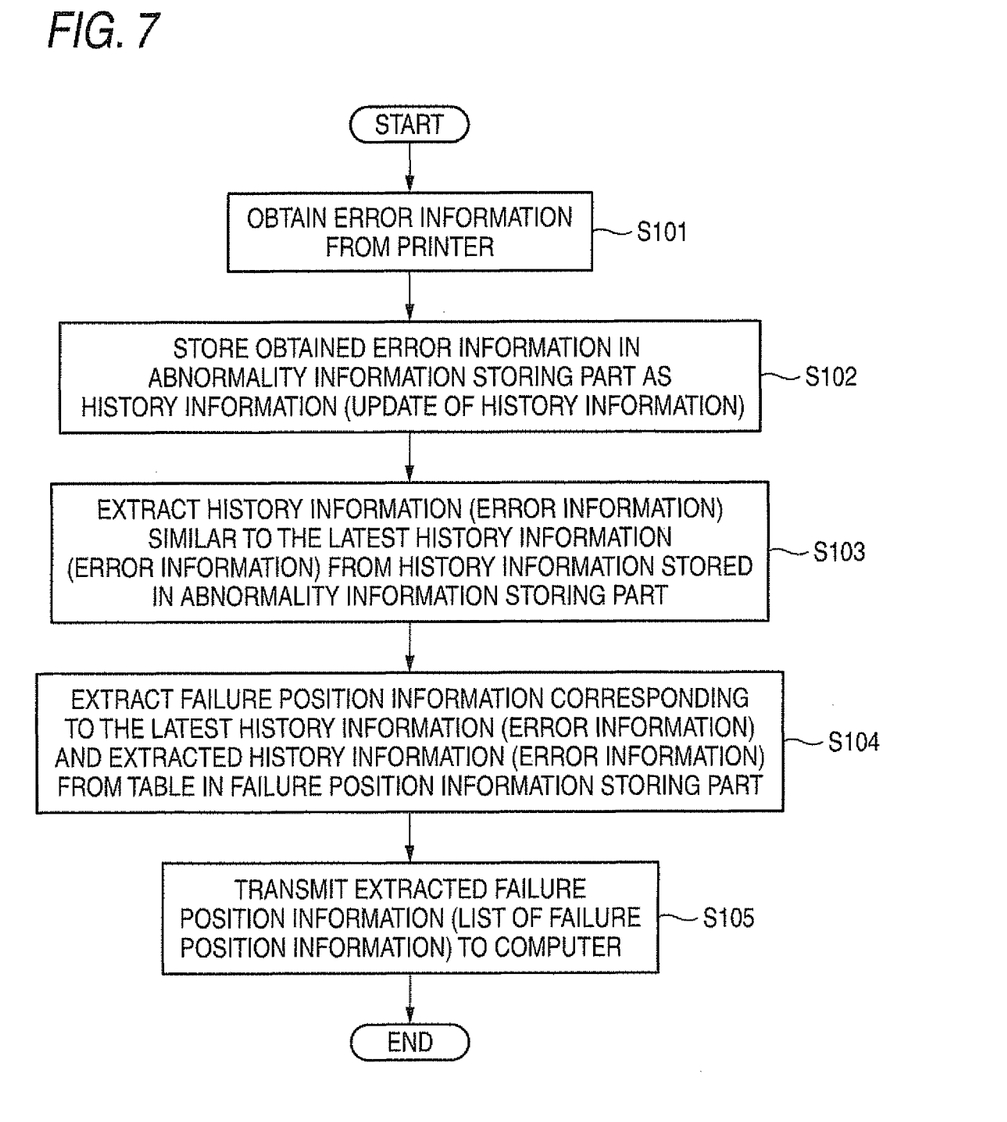
FIG. 7 is a flowchart showing a procedure of an extracting process of failure position information by the server device according to the exemplary embodiment.

FIG. 7 is a flowchart showing a procedure of the extracting process of the failure position information.

In the server device 30, when the obtaining part 32 obtains the error information from the printer 10 (the printer A) through the communication part 31 (step S101), the obtaining part 32 stores the obtained error information in the abnormality information storing part 33 as the history information (step S102).

Figure 8A:
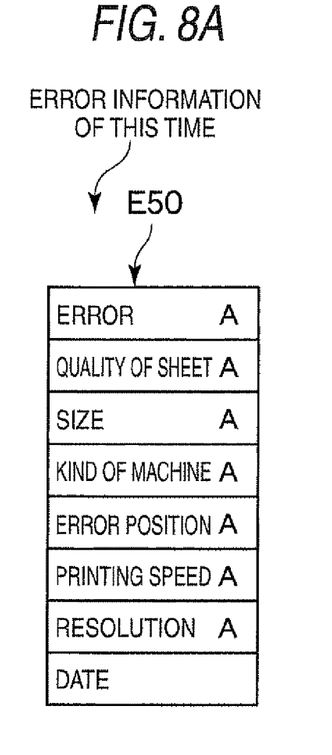
FIGS. 8A and 8B are diagrams for explaining process stages of an extracting process by an extracting part of the server device according to the exemplary embodiment.

Here, the error information obtained this time is supposed to be the error information E50 shown in FIG. 8A. Further, the history information stored in the abnormality information storing part 33 is supposed to be the history information 330 shown in FIG. 4 when the error information E50 is stored in the abnormality information storing part 33.

The extracting part 35 extracts the error information similar to the latest error information (the error information obtained this time) E50 from the history information 330 stored in the abnormality information storing part 33 (step S103).

Figure 8B:
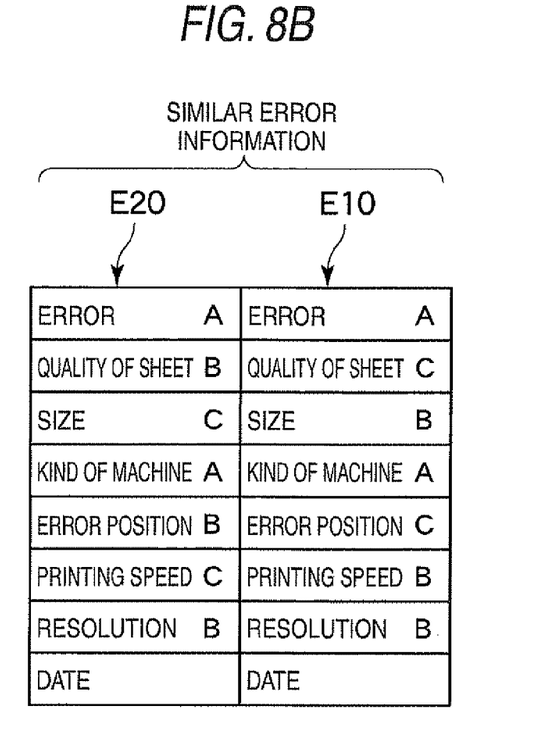

Here, the extracting part 35 extracts, as shown in FIG. 8B, the error information E10 and the error information E20 having the same error contents as the error contents (the error A) of the latest error information E50 as the error information similar to the latest error information E50 from the history information 330. The error A is supposed to be, for instance, the jam.

Then, the extracting part 35 extracts the failure position information corresponding to the latest error information E50 and the above-described extracted error information E10 and E20 from the table 340 (see FIG. 5) stored in the failure position information storing part 34 (step S104).

Then, the output part 36 transmits the extracted result (one or more failure position information) extracted by the extracting part 35 to the computer 40 through the communication part 31 (step S105).

Here, the extracting part 35 extracts the failure position information, namely, the "failure position #1", the "failure position #2", the "failure position #3" and the "failure position #4" from the table 340 shown in FIG. 5 on the basis of the values (the parameter values) of the element information (the parameters) of the error (the error contents), the "quality of the sheet", the "size" and the "error position" respectively related to the error information E10, the error information E20 and the error information E50. One example of the extracted results is shown in FIG. 9.

In the extracting process of the failure position information in this case, the extracting part 35 substitutes the above-described parameter values for the conditional expression and calculates the conditional expression to obtain the failure position information of the "failure positions #1 to #4".

When the extracting part 35 extracts a plurality of failure position information, the extracting part 35 carries out a process for making clear whether a rate of a cause estimated to be related to the occurring error is high or low for the plurality of failure position information. For instance, the extracting part 35 carries out previously set processes such as a process for arranging the plurality of failure position information in order of high rate of the cause or a process for assigning regular order numbers in order of high rate of the cause respectively correspondingly to the plurality of failure position information and the above-described two processes.

Figure 9:
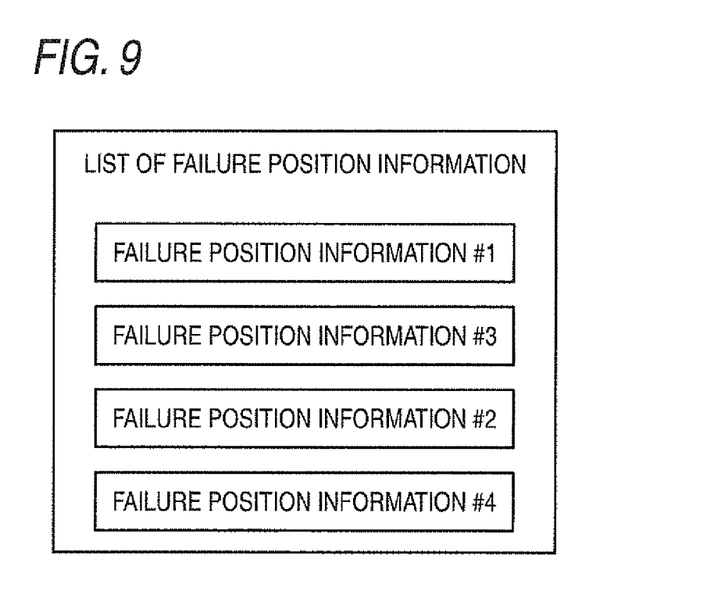
FIG. 9 is a diagram showing one example of a result of the extracting process of the failure position information by the extracting part of the server device according to the exemplary embodiment.

In this connection, the example shown in FIG. 9 illustrates a case that the plurality of failure position information of the "failure positions #1 to #4" is rearranged in order of high rate of the cause estimated to be related to the error That is, the "failure position #1", the "failure position #3", the "failure position #2" and the "failure position #4" are arranged in order of high rate of the cause estimated to be related to the error.

Since such an extracted result as shown in FIG. 9 is displayed on the display device 46 of the computer 40, the user (a manager, an operator) who cancels the error of the printer 10 (the printer A) in which the error occurs may decide that a true cause of the error occurring in the printer 10 (the printer A) is located in the "failure position #1" whose rate of the cause is high to try to cancel the error.

Further, when the user (the manager, the operator) tries to cancel the error in all the "failure position #1", the "failure position #3", the "failure position #2" and the "failure position #4", however, the error is not cancelled, the user operates the input device 45 to instruct the extracted result shown in FIG. 9 to be transmitted to the service center 50. Thus, in the computer 40, the control part 44 prepares the extracted result shown in FIG. 9 as, for instance, electronic mail data and transmits the prepared electronic mail data to the service center 50 through the communication part 42.

Now, the extracting process of the failure position information by the server device will be described by using a specific example.

Figure 10:
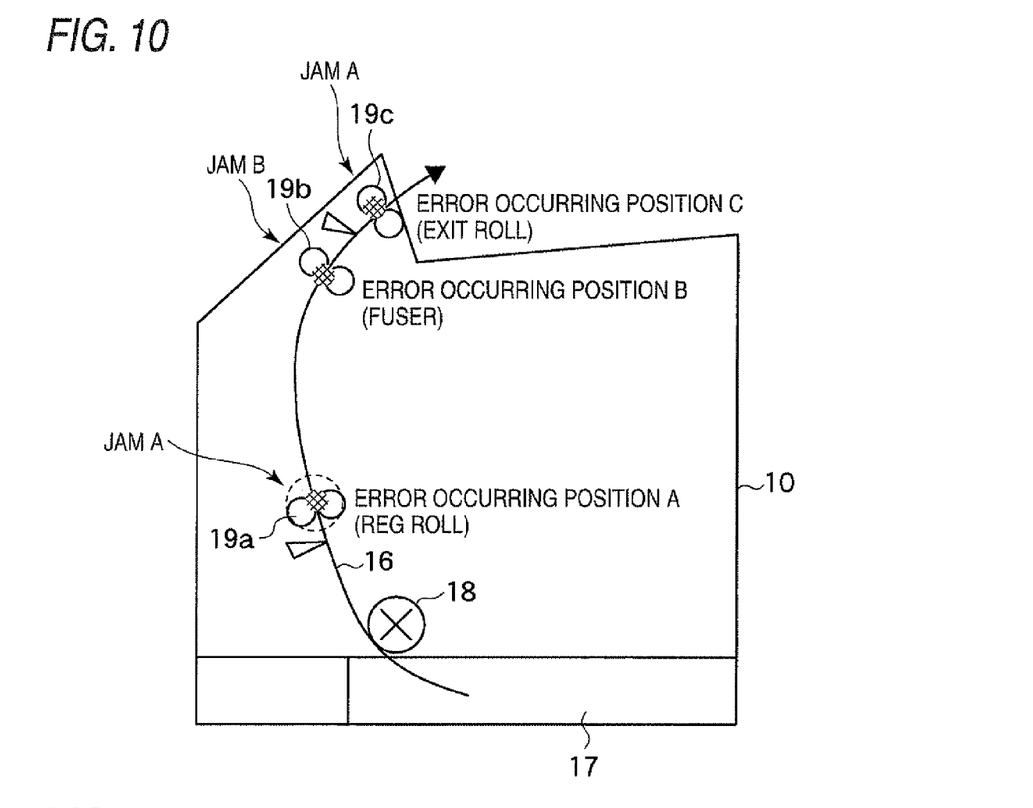
FIG. 10 is a diagram for explaining errors occurring in the printer according to the exemplary embodiment.

In the printer 10 (the printer A), as shown in FIG. 10, a sheet accommodated in a sheet feeder 17 is supposed to be conveyed to a sheet conveying path 16 by driving a motor 18 and discharged via a "reg roll" 19a, a "fuser" 19b and an "exit roll" 19c.

Then, initially, a jam, (refer it to as a jam A) is supposed to occur in an error occurring position C, that is, the "exit roll" 19c. After the jam is cancelled, a jam (a jam B) is supposed to occur in an error occurring position B, that is, the "fuser" 19b. After the jam (the jam B) is cancelled, a jam (a jam A) is supposed to occur this time in an error occurring position A, that is, the "reg roll" 19a. Here, the jam A is supposed to be different from the jam B in property.

When the printer 10 in which the jam (the jam A) occurs this time transmits the error information related to the jam (the jam A) to the server device 30, the server device 30 stores the obtained error information in the abnormality information storing part 33 as described above. Then, the extracting part 35 extracts the error information similar to the latest error information (the error information of this time) from the history information stored in the abnormality information storing part 33.

Here, the error information similar to the error information of this time, that is, the error information related to the jam A occurring in the "reg roll" 19a is supposed to be only the error information related to the jam A occurring in the "exit roll" 19c. Since the error information related to the jam B occurring in the error occurring position B (the "fuser" 19b) is error information related to the jam whose property is different from that of the jam A, the error information related to the jam B is not extracted.

Then, the extracting part 35 extracts the failure position information corresponding to the above described latest error information and the extracted error information from the table 340 (see FIG. 5) stored in the failure position information storing part 34.

Figure 11:
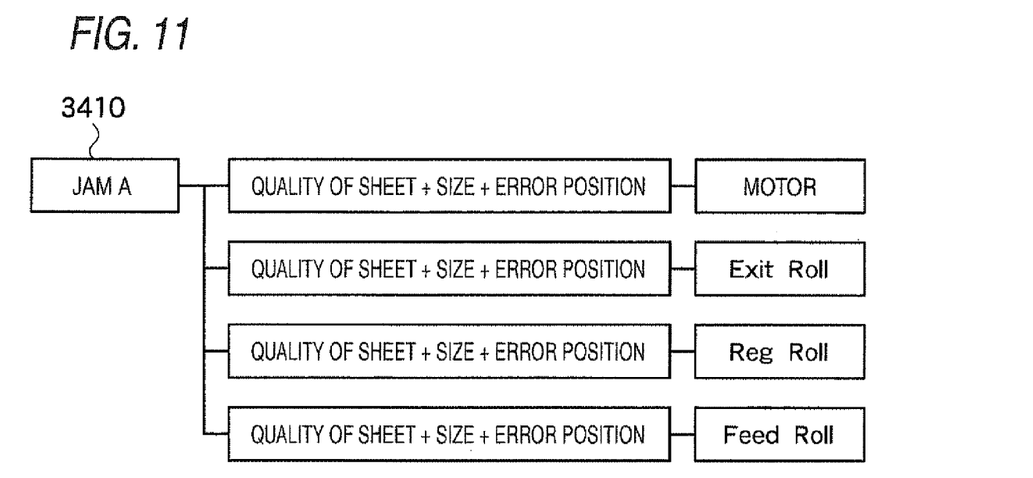
FIG. 11 is a diagram showing a specific example of the failure position information in the table stored in the failure position information storing part of the server device according to the exemplary embodiment.

Here, in the table 340, the error 3410 (the error A) indicates the jam A and the failure position information "the failure positions #1 to #4" corresponding to the error 3410 (the jam A) is supposed to have such contents as shown in FIG. 11 Namely, the "failure position #1" is supposed to be the "motor", the "failure position #2" is supposed to be the "exit roll", the "failure position #3" is supposed to the "reg roll" and the "failure position #4" is supposed to be a "feed roll".

The extracting part 35 extracts the failure position information on the basis of the element information of the error information related to the jam A. When the extracting part 35 extracts the plurality of failure position information, the extracting part 35 carries out the process for making clear whether a rate of a cause estimated to be related to the occurring error (the jam A) is high or low for the plurality of failure position information. One example of a result (an extracted result) of this process is shown in FIG. 12.

Figure 12:
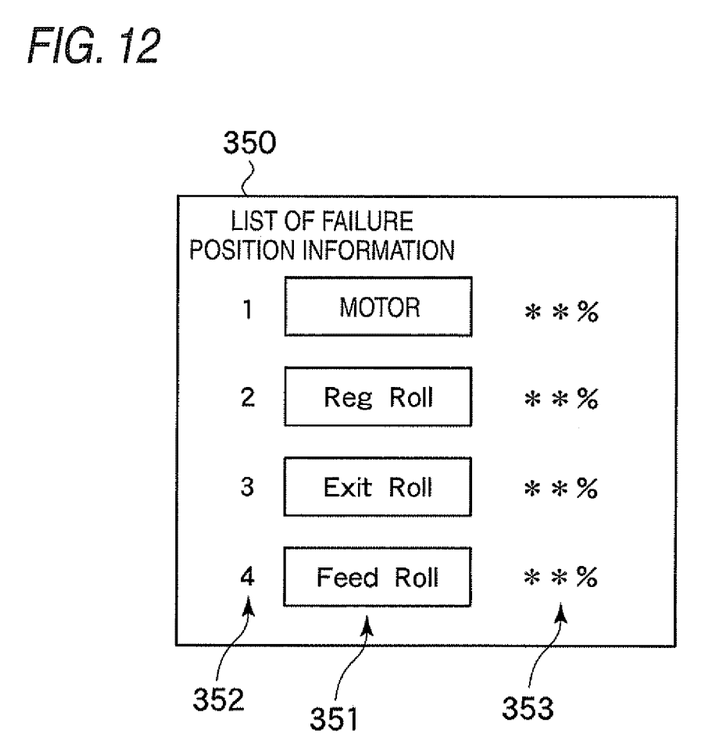
FIG. 12 is a diagram showing a specific example of the result of the extracting process of the failure position information by the extracting part of the server device according to the exemplary embodiment.

In the extracted result 350 shown in FIG. 12, the plurality of failure position information is rearranged in order of high rate of the cause estimated to be related to the occurring error (the jam A) as shown by a code 351. Further, numbers (order) are assigned to the plurality of failure position information in order of high rate of the cause correspondingly to the plurality of failure position information as shown by a code 352 and the rate (%) is assigned to the plurality of failure position information as shown by a code 353.

In the exemplary embodiment, the plurality of failure position information is expressed at least in a form shown by the code 351. Further, when a form shown by the code 351 is combined with a form shown by the code 352 or the code 353 to output the plurality of failure position information, the plurality of failure position information does not need to be arranged in order of high rate of the cause, because the number (the order) or the rate (%) in the form shown by the code 352 or the code 353 is recognized so that the order of high rate of the cause may be understood. However, when the plurality of failure position information is expressed, from the viewpoint of specifying the cause (the true cause) related to the error occurring in the printer, a notation in the forms respectively shown by the code 351, the code 352 and the code 353 is more desirable as shown in the example of FIG. 12.

The extracted result 350 is transmitted from the server device 30 to the computer 40. Further, when the user operates the input device 45 of the computer 40 to instruct the extracted result to be transmitted, the electronic mail data is transmitted from the computer 40 to the service center 50.

In the exemplary embodiment, the computer 40 outputs the extracted result from the server device 30 to the display device 46 or transmits the extracted result to the service center 50 as the electronic mail data. However, the present invention is not limited thereto and the computer 40 may carry out a below-describe process.

Namely, the computer 40 may convert the extracted result from the server device 30 to data (the image data) in a data form that may be printed in the printer 47, and then, output the image data to the printer 47 to be printed and outputted.

Further, in the exemplary embodiment, the server device 30 transmits the extracted result to the computer 40. However, the present invention is not limited thereto and the server device 30 may carry out a below-described process.

Namely, the server device 30 may transmit the extracted result to the failed printer 10 (the printer A). The printer 10 may display the received extracted result on the operating panel part 15.

In the exemplary embodiment, the error information is stored in the abnormality information storing part 33 as the history information because of a following reason.

That is, as shown in FIG. 10, when the error information related to the errors respectively occurring in the error occurring position A, the error occurring position B and the error occurring position C is stored in the abnormality information storing part 33 as the history information, the error information similar to the error information related to the error occurring this time is extracted from the history information by the extracting part 35. The error occurring this time is supposed to occur in the error occurring position A.

The extracting part 35 recognizes that the errors occur in order of the error occurring position C, the error occurring position B and the error occurring position A from the history of the error information of the plurality of error occurring positions A, B and C respectively. Namely, the extracting part 35 recognizes that the error occurring position of a newly occurring error is located at a position the nearer to the motor 18 from the "exit roll" 19c in the sheet conveying path 16.

In the exemplary embodiment, the error information is stored as the history information so that the extracting part 35 learns the transition of the error occurring position (or the error information).

Now, a hardware structure of the server device 30 (the processor) according to the exemplary embodiment will be described by referring to FIG. 13.

Figure 13:
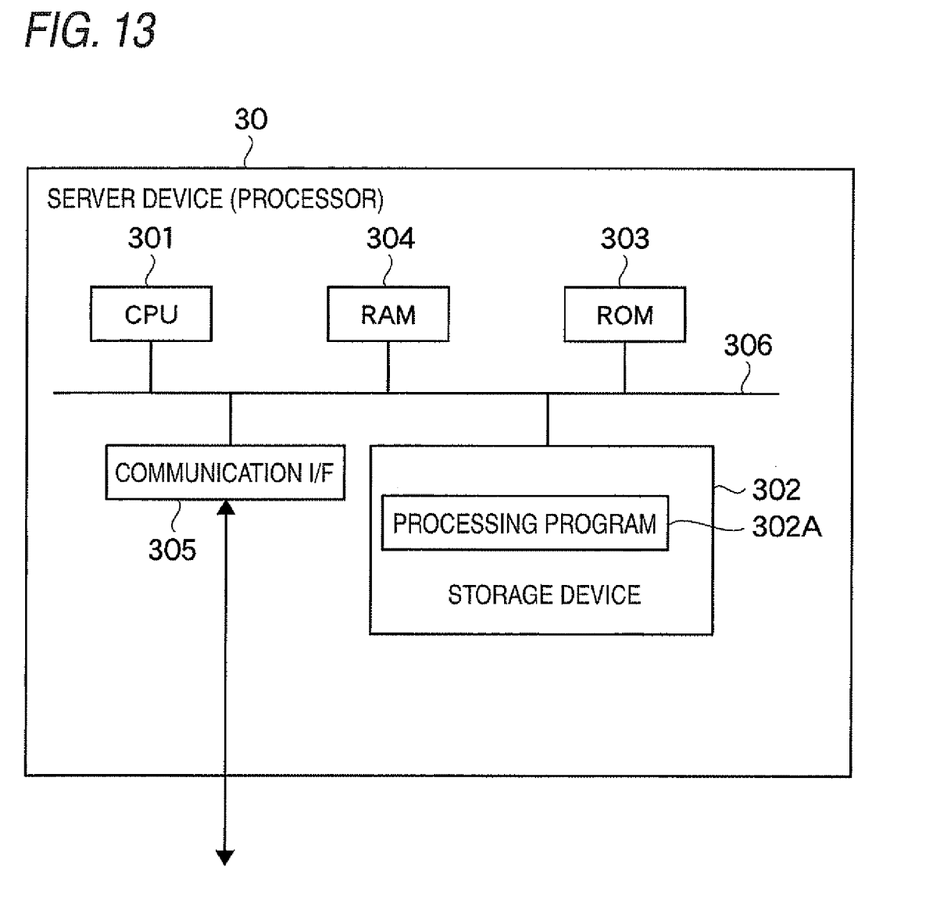
FIG. 13 is a block diagram showing a hardware structure of the server device according to the exemplary embodiment.

FIG. 13 shows the hardware structure of the server device (the processor) 30.

The server device (the processor) 30 is, for instance, a computer. As shown in FIG. 13, the server device 30 includes a CPU 301, a storage device 302 such as a hard disk, a ROM 303, a RAM 304 and a communication interface (a communication I/F) 305. These components 301 to 305 are connected to a system bus 306.

The storage device 302 stores various kinds of installed programs such as software (a program) for realizing the functions of the obtaining part 32, the extracting part 35 and the output part 36 respectively shown in FIG. 3, software (a program) corresponding to the above-described procedure (see FIG. 7) of the extracting process of the failure position information, a processing program 302A or the like.

Further, the storage device 302 has the functions of the abnormality information storing part 33 and the failure position information storing part 34 respectively shown in FIG. 3 to store, for instance, the history information 330 (see FIG. 4) and the table 340 (see FIG. 5).

The processing program 302A includes at least below-described processes (1) to (4) respectively.

(1) An obtaining process for obtaining the abnormality information related to the abnormality from the image forming device in which the abnormality occurs. This process is carried out by the obtaining part 32.

(2) A storing process for storing the abnormality information obtained in the obtaining process in the abnormality information storing unit as the history information. This process is carried out by the obtaining part 32.

(3) An extracting process for extracting the failure position information corresponding to the latest abnormality information and the abnormality information similar to the latest abnormality information among the abnormality information stored in the abnormality information storing unit from the failure position information for each phenomenon related to the abnormality stored in the failure position information storing unit. This process is carried out by the extracting part 35.

(4) An output process for outputting the extracted result extracted in the extracting process as the specific deciding information of the cause related to the occurring abnormality. This process is carried out by the output part 36.

The ROM 303 is a read-only memory and stores communication protocol information.

The RAM 304 stores data transmitted and received through the communication part 31, for instance, the error information (received data) from the printer 10 or the extracted result (transmitted data) transmitted to the computer 40 and also stores an intermediate result (for instance, information shown in FIG. 8B) or a final result (for instance, information shown in FIG. 9) of the extracting process by the extracting part 35.

The communication I/F 305 carries out a function of the communication part 31 shown in FIG. 3 to communicate with an external device, for instance, the printer 10 or the computer 40 through the communication line 61.

The CPU 301 is a central processing unit that reads and executes programs including the processing program 302A to the RAM 304 from the storage device 302 to realize the above-described functions of the obtaining part 32, the extracting part 35 and the output part 36 respectively and realize a processing function corresponding to the processing program 302A.

Further, the CPU 301 integrally controls the above-described components 302 to 305 and controls the entire part of the server device 30.

In this specification, the processing program is recorded in the storage device such as the hard disk of a recording medium in the exemplary embodiment, however, the processing program may be provided in such a way as described below.

Namely, the processing program may be stored in the ROM and the CPU may load and execute the processing program in a main storage device from the ROM.

Further, the above-described processing program may be stored and distributed in a recording medium capable of being read by the computer such as a DVD-ROM, a CD-ROM, an MO (a photo-electro-magnetic disk), a flexible disk, etc. In this case, after the processing program recorded in the recording medium is installed in the server device (the processor), the processing program is executed by the CPU. As a part in which the processing program is installed, a memory such as the RSM, the storage device (the recording medium) such as the hard disk, etc. may be exemplified. Then, the server device (the processor) loads and executes the processing program stored in the storage device in the main storage device as required.

Further, the server device (the processor) may be connected to a file server device or a host computer through a communication line (for instance, an internet) so that the server device (the processor) downloads the above-described processing program from the file server device or the host computer and then executes the processing program. In this case, as a part in which the processing program is downloaded, a memory such as the RAM or the storage device (the recording medium) such as the hard disk may be exemplified. Then, the server device (the processor) loads and executes the processing program stored in the storage device in the main storage device as required.

The invention devised by the inventor is specifically described in accordance with the exemplary embodiment, however, it is to be understood that the exemplary embodiment disclosed in this specification is exemplified in view of all points and the invention is not limited to the disclosed technique. Namely, it is to be understood that the technical scope of the present invention is not restrictedly interpreted in accordance with the explanation of the exemplary embodiment, but interpreted to the end in accordance with the description of claims, and techniques equivalent to the technique described in claims and all changes may be included without departing from the gist of claims.

The present invention may be applied to the processor connected, through the communication line, to the image forming device having at leas t one image forming function of a plurality of image forming functions such as a printing function, a copying function, a scanning function and a facsimile function.

What is claimed is:

1. A processor comprising:
an obtaining unit that obtains abnormality information related to an abnormality from an image forming device in which the abnormality occurs;
an abnormality information storing unit that stores the abnormality information obtained by the obtaining unit as history information;
a failure position information storing unit that stores failure position information for each phenomenon related to the abnormality;
an extracting unit that extracts the failure position information corresponding to the latest abnormality information and abnormality information similar to the latest abnormality information among the abnormality information stored in the abnormality information storing unit from the failure position information storing unit; and
an output unit that outputs an extracted result extracted by the extracting unit as specific deciding information of a cause related to the occurring abnormality, wherein
the abnormality information includes at least information showing the occurring abnormality and information showing a position where the abnormality occurs,
the failure position information for each phenomenon related to the abnormality corresponds to a result obtained by substituting parameters including at least the information showing the occurring abnormality and the information showing the position where the abnormality occurs for a conditional expression and calculating the conditional expression, and
the extracting unit substitutes parameters of the latest abnormality information and the abnormality information similar to the latest abnormality information respectively for the conditional expression and calculates the conditional expression to extract the failure position information corresponding to the abnormality information from the failure position information storing unit.

2. A processor according to claim 1, wherein
when the extracted result includes a plurality of failure position information, the extracting unit makes clear whether a rate, of the cause estimated to be related to the occurring abnormality is high or low for the plurality of failure position information.

3. An image forming system comprising:
one or more image forming devices; and
a processor connected to the one or more image forming devices through a communication line,
the processor including:
an obtaining unit that obtains abnormality information related to an abnormality from the image forming device in which the abnormality occurs;
an abnormality information storing unit that stores the abnormality information obtained by the obtaining unit as history information;
a failure position information storing unit that stores failure position information for each phenomenon related to the abnormality;
an extracting unit that extracts the failure position information corresponding to the latest abnormality information and abnormality information similar to the latest abnormality information among the abnormality information stored in the abnormality information storing unit from the failure position information storing unit; and
an output unit that outputs an extracted result extracted by the extracting unit as specific deciding information of a cause related to the occurring abnormality, wherein
the abnormality information includes at least information showing the occurring abnormality and information showing a position where the abnormality occurs,
the failure position information for each phenomenon related to the abnormality corresponds to a result obtained by substituting parameters including at least the information showing the occurring abnormality and the information showing the position where the abnormality occurs for a conditional expression and calculating the conditional expression, and the extracting unit substitutes parameters of the latest abnormality information and the abnormality information similar to the latest abnormality information respectively for the conditional expression and calculates the conditional expression to extract the failure position information corresponding to the abnormality information from the failure position information storing unit.

4. An image forming system according to claim 3, further comprising:

an information processor connected to the one or more image forming devices and the processor through the communication line and connected to a service center through other communication line, wherein the output unit transmits the extracted result to the information processor through the communication line as the specific deciding information of the cause related to the occurring abnormality, and the information processor transmits the received extracted result to the service center through the above-described other communication line.

5. A non-transitory computer readable medium storing a program causing a computer to execute a process for processing, the process comprising:

an obtaining process that obtains abnormality information related to an abnormality from an image forming device in which the abnormality occurs;

a storing process that stores the abnormality information obtained in the obtaining process in an abnormality information storing unit as history information;

an extracting process that extracts failure position information corresponding to the latest abnormality information and abnormality information similar to the latest abnormality information among the abnormality information stored in the abnormality information storing unit from the failure position information for each phenomenon related to the abnormality stored in a failure position information storing unit; and an output process that outputs an extracted result extracted in the extracting process as specific deciding information of a cause related to the occurring abnormality, wherein the abnormality information includes at least information showing the occurring abnormality and information showing a position where the abnormality occurs, the failure position information for each phenomenon related to the abnormality corresponds to a result obtained by substituting parameters including at least the information showing the occurring abnormality and the information showing the position where the abnormality occurs for a conditional expression and calculating the conditional expression, and an extracting unit substitutes parameters of the latest abnormality information and the abnormality information similar to the latest abnormality information respectively for the conditional expression and calculates the conditional expression to extract the failure position information corresponding to the abnormality information from the failure position information storing unit.

* * * * *